UNITED STATES PATENT OFFICE.

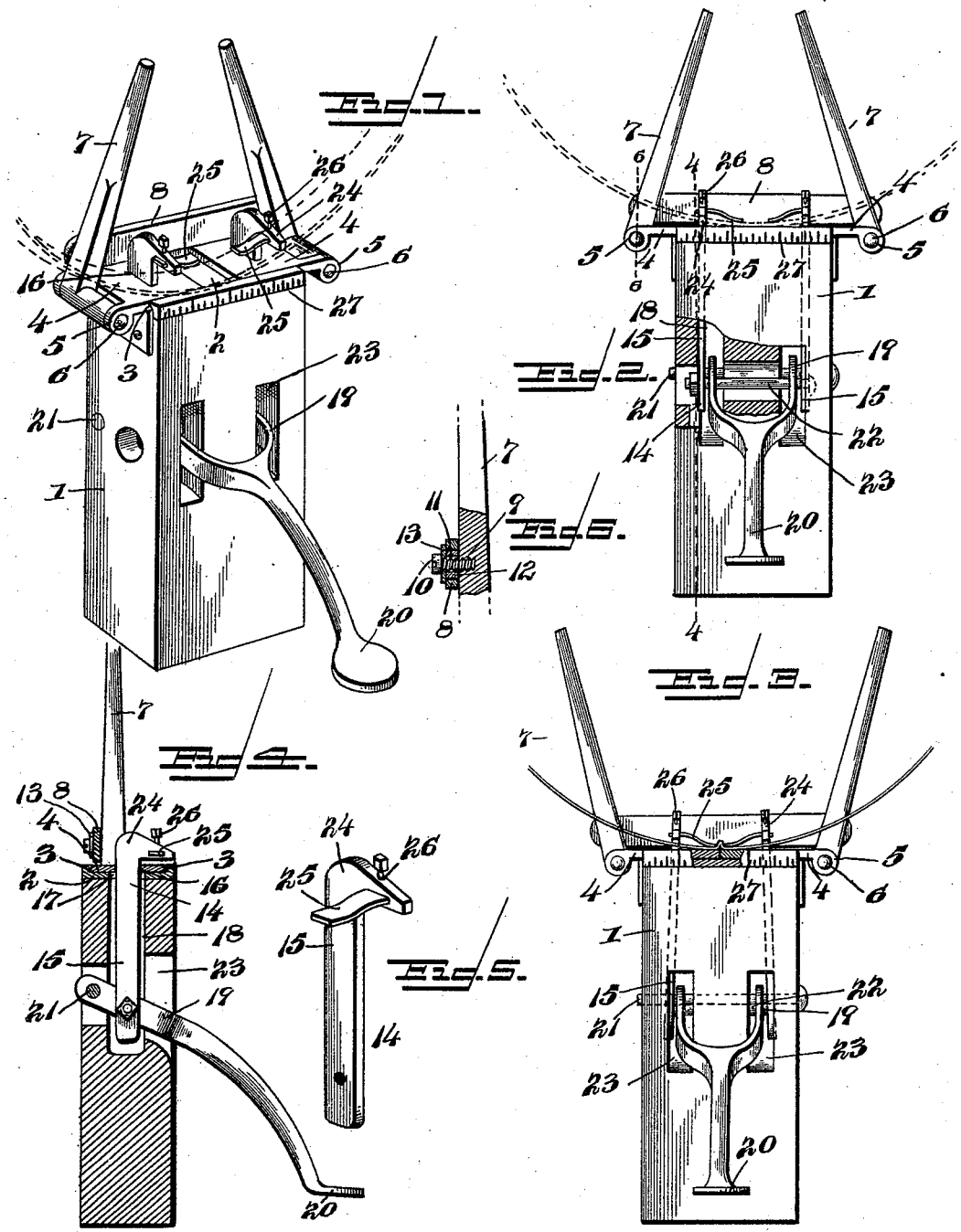

OSBORNE T. LYTTEN, OF LOWELL, ASSIGNOR TO G. M. McADEN, OF McADENSVILLE, NORTH CAROLINA.

TIRE SHRINKING OR UPSETTING DEVICE.

SPECIFICATION forming part of Letters Patent No. 529,740, dated November 27, 1894.

Application filed June 20, 1894. Serial No. 515,184. (No model.)

*To all whom it may concern:*

Be it known that I, OSBORNE T. LYTTEN, a citizen of the United States, residing at Lowell, in the county of Gaston and State of North Carolina, have invented a new and useful Tire Shrinking or Upsetting Device, of which the following is a specification.

My invention relates to a machine for shrinking or upsetting tires, and it has for its object to provide a simple, inexpensive, and efficient device adapted for shrinking or upsetting a tire to a given extent indicated by a scale in order to take up a definite amount of slack.

Further objects and advantages of the invention will appear in the following description, and the novel features thereof will be particularly pointed out in the appended claims.

In the drawings:—Figure 1 is a perspective view of a machine embodying my invention, showing the parts in the positions occupied thereby previous to clamping the tire in place. Fig. 2 is a front view partly broken away showing the parts in the positions which they assume after the depression of the foot-treadle. Fig. 3 is a similar view showing the positions of the parts after the operating-levers have been moved outward to crimp the tire. Fig. 4 is a vertical section on the line 4—4 of Fig. 2. Fig. 5 is a detail view in perspective of one of the clamping jaws with its attached pressure.

Similar numerals of reference indicate corresponding parts in all the figures of the drawings.

1 designates a standard, to the upper end of which is fastened a transverse dovetailed guide 2, and in the dovetailed channel or way 3 thereof are slidably fitted the anvil-plates 4. These anvil-plates are provided at their outer ends with ears 5 connected by pins 6, upon which are fulcrumed the operating-levers 7. The operating levers are connected at points adjacent to and above the plane of their pivots by means of a horizontal link 8. The operating levers are provided with threaded sockets 9, which receive the extremities of the pivot-bolts 10, said bolts passing through perforations 11 in the link, and arranged around the pivot-bolts in these perforations of the link are sleeves 12, washers 13 being arranged upon the rear ends of said sleeves for the pressure of the heads of said bolts. Owing to the connecting link between the operating levers either or both of the anvil-plates may be moved laterally by the movement of the upper or free ends of the operating levers, the pivotal connections of said levers with the link forming the fulcrums for the levers, whereby said plates may be separated or brought into contact at their inner ends.

14 indicates twin vertically movable clamping jaws having shanks 15, which are fitted slidably in guide-openings 16 in the anvil-plates and which operate in elongated openings or slots 17 in the guide-plate, and the lower ends of these shanks, which extend downward through recesses 18 in the standard, are pivotally connected to the arms 19 of the bifurcation at the rear end of the foot-treadle 20, said arms of the treadle being fulcrumed at their rear extremities by means of a transverse pin 21. A common pivot-bolt 22 forms the connection between the shanks of the clamping-jaws and the arms of the treadle, and said arms operate in vertical slots 23 formed in the front of the standard and communicating with said recesses 18. The forwardly extending jaws are provided at intermediate points with horizontal seats 24, in which are fitted the removable pressure-plates 25, the same being held in place by means of set-screws 26. These pressure-plates are curved downward toward their inner ends and terminate flush with the inner edges of the anvil-plates, said inner ends of the clamping-plates being slightly below the plane of the under sides of the clamping-jaws. In operation, the upper ends of the operating-levers are drawn toward each other, and the foot-treadle is elevated, as shown in Fig. 1, to permit of the insertion of one side of a tire between the anvil-plates and the under sides of the clamping-jaws, after which the foot-treadle is depressed, as shown in Fig. 2, to draw the clamping-jaws down upon the tire and clamp the same firmly upon the anvil-plates at points upon opposite sides of the point at which the proposed crimp is to be made, the inner ends of the pressure-plates bearing firmly upon the surface of the tire. The upper or free ends of the operating-levers are then drawn outward or from each other in order to cause the desired fold or crimp in the tire to take up the slack. It will be seen that the clamping-jaws move laterally with the anvil-plates, and in order to allow for this lateral movement of the jaws the shanks thereof are loosely connected to the arms of the foot-treadle by forming the openings in their lower ends slightly larger than the pivot-bolt by which they are connected to the treadle. Other ways of allowing freedom of movement of the jaws independently of the pivotal points of their shanks may be adopted, as for instance, a slight flexibility of said shanks.

The front side of the guide-plate which is secured to the upper end of the standard is provided with a graduated scale 27, to enable the operator to secure the desired separation of the inner ends of the anvil-plates, and hence the desired extent of upset in the tire. It will be understood, moreover, that the pressure-plates are removable for the purpose of replacing them when worn or injured, or for the purpose of giving them the desired curvature.

Various changes in the form, proportion, and the minor details of construction may be resorted to without departing from the spirit of the invention or sacrificing any of the advantages thereof.

Having described my invention, what I claim is—

1. In a device of the class described, the combination with a standard provided at its upper end with a transverse guide, of anvil-plates slidably mounted in said guide, hand operated means for moving the anvil-plates toward and from each other, clamping-jaws carried by the anvil-plates and capable of movement in planes perpendicular thereto, and means consisting of a foot-lever and connections for depressing the clamping-jaws to engage a tire, substantially as specified.

2. In a device of the class described, the combination with a standard provided at its upper end with a transverse guide, of anvil-plates slidably mounted upon the guide, operating levers fulcrumed to the anvil-plates respectively, a link connecting intermediate points of the operating levers, vertically movable clamping-jaws having their shanks fitted in guides in the anvil-plates, and a foot-lever connected with the shanks of the clamping-jaws, substantially as specified.

3. In a device of the class described, the combination with a standard provided at its upper end with a guide, of anvil-plates slidably mounted in said guide and capable of movement toward and from each other, levers operatively connected with the anvil-plates respectively, clamping-jaws carried by the anvil-plates, means for operating the clamping-jaws in planes perpendicular to the plane of the anvil-plates, and pressure-plates detachably secured to the jaws and extending inward to the adjacent edges of the anvil-plates, substantially as specified.

4. In a device of the class described, the combination with a standard, of a guide-plate secured to the upper end thereof and provided with a dovetailed way, dovetailed anvil-plates fitting slidably in said way, operating-levers fulcrumed to the outer ends of the anvil-plates, a link connecting the operating levers, clamping-jaws overhanging the anvil-plates and provided with shanks extending through guide-openings therein and through elongated openings in the guide-plate, pressure-plates carried by the clamping-jaws, and a bifurcated foot-treadle having its arms pivotally connected with the lower ends of the shanks of the clamping-jaws, substantially as specified.

5. In a device of the class described, the combination with a standard, of a guide-plate secured threreto and provided with a graduated scale, anvil-plates slidably mounted upon the guide-plate and capable of movement toward and from each other, levers operatively connected with the anvil-plates, clamping-jaws carried by the anvil-plates and capable of movement in planes perpendicular to that of the plates, pressure-plates carried by the clamping-jaws and terminating flush with the inner ends of the anvil-plates, and a foot-treadle operatively connected with the clamping-jaws, substantially as specified.

In testimony that I claim the foregoing as my own I have hereto affixed my signature in the presence of two witnesses.

O. T. LYTTEN.

Witnesses:
W. L. CAMPBELL,
J. B. HOSTER.